N. STAFFORD.
Thief and Test for Liquids.
No. 51,879.　　　　　　　　　　　　　　　　　　Patented Jan'y 2, 1866.
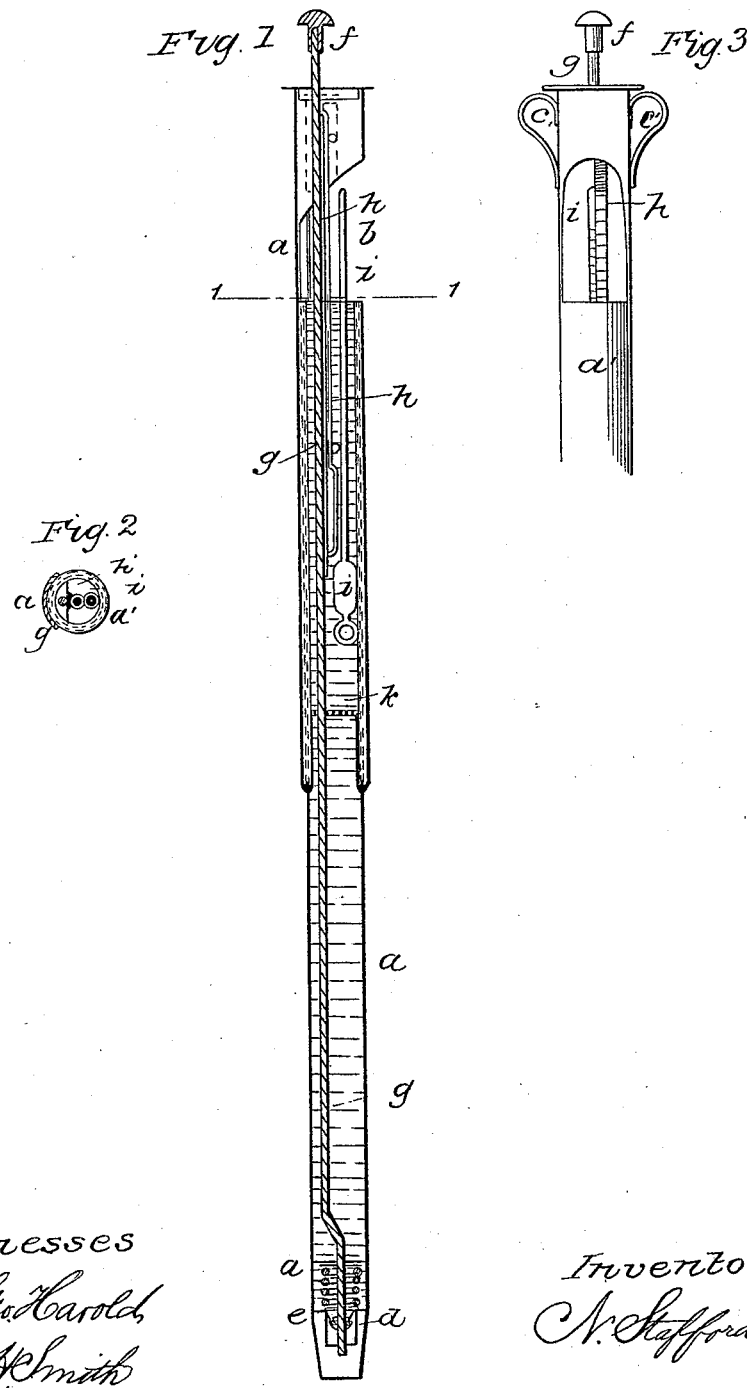
Witnesses
Thos. Geo. Harold
Chas. H. Smith
Inventor
N. Stafford

UNITED STATES PATENT OFFICE.

NELSON STAFFORD, OF BROOKLYN, NEW YORK.

IMPROVEMENT IN THIEFS AND TESTS FOR LIQUIDS.

Specification forming part of Letters Patent No. 51,879, dated January 2, 1866.

*To all whom it may concern:*

Be it known that I, NELSON STAFFORD, of Brooklyn, in the county of Kings and State of New York, have invented, made, and applied to use an Improved Thief and Test for Liquids; and I do hereby declare the following to be a full, clear, and exact description of my said invention, reference being had to the annexed drawings, making part of this specification, wherein—

Figure 1 is a vertical longitudinal section of my instrument, and Fig. 2 is a sectional plan at the line 1 1. Fig 3 is an elevation of the upper part of my thief and test, showing the handles for holding the same.

Similar letters indicate the same parts.

In the testing of oils, liquors, spirits, and liquids in general it is usual to employ a tube for drawing up from the barrel or other containing-vessel sufficient liquid for filling a test-glass, in which to determine the gravity, quality, &c., of said liquid. This tube generally is formed with a hole near the end to be covered by the finger, so as to draw up the tube full of liquid by atmospheric pressure, and said tube is generally termed in the trade a "thief." The inspector or person testing the liquid usually has to carry aforesaid thief-tube, a test-glass, a hydrometer or equivalent gage, and a thermometer, and either of these is liable to be broken, besides which there is considerable inconvenience in the use of these different devices, and often the liquid is spilled in being transferred from the thief to the test-glass, or in being poured from the latter back into the barrel or other vessel.

My invention consists in a combined thief-tube and test, whereby all the requisite instruments are combined in one, so that the inspection of the liquid can be made much more rapidly and accurately than with the instruments heretofore employed, and waste of the liquid is avoided.

In the drawings, $a$ represents a tube of any desired size or length. This tube is to have an open end or mouth at the part $b$, and extended up and provided with a head-piece, $c$, and handles at the sides, (shown by dotted lines, and at $c'$, Fig. 3,) by means of which the tube can be easily moved and lowered into the liquid to be tested and raised up with said liquid in it.

I provide a valve, $d$, at the bottom, closed by a spring, $e$, and opened by the pressure of the thumb or fingers upon the button end $f$ of the rod $g$.

The thermometer $h$ is provided, by means of which the temperature of the liquid is determined, that the proper allowance may be made, with the hydrometer $i$, in determining the gravity.

The tube $a$ is to be provided with a gauze diaphragm at $k$, to support the hydrometer $i$ when there is no liquid in the tube. I prefer that the tube $a$ be formed of metal and receive a glass cylinder at the part $a'$, in order that the color of the liquid may also be inspected; but if this was not required the hydrometer and thermometer could be observed through the opening at $b$ if the tube $a$ was made entirely of metal.

This apparatus is complete in itself, and requires no separate test-glass, thermometer, or hydrometer, and there need be no liquid spilled, as the same can be allowed to run directly back into the barrel by opening the valve.

What I claim, and desire to secure by Letters Patent, is—

1. A thief-tube formed with an opening, as set forth, in combination with a hydrometer or gage, as and for the purposes set forth.

2. The combination of a thermometer, a hydrometer, or gage, and a thief-tube, substantially as set forth.

3. The combination of a thief-tube, test-glass, thermometer, and hydrometer, substantially as set forth.

In witness whereof I have hereunto set my signature this 7th day of August, A. D. 1865.

N. STAFFORD.

Witnesses:
CHAS. H. SMITH,
J. E. SERRELL, Jr.